US011822956B2

(12) United States Patent
Luo et al.

(10) Patent No.: US 11,822,956 B2
(45) Date of Patent: Nov. 21, 2023

(54) ADAPTIVE THREAD GROUP DISPATCH

(71) Applicant: ADVANCED MICRO DEVICES (SHANGHAI) CO., LTD., Shanghai (CN)

(72) Inventors: ZhongXiang Luo, Shanghai (CN); JiXin Shan, Shanghai (CN); MingTao Gu, Shanghai (CN)

(73) Assignee: Advanced Micro Devices (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/134,781

(22) Filed: Dec. 28, 2020

(65) Prior Publication Data

US 2022/0206838 A1 Jun. 30, 2022

(51) Int. Cl.
*G06T 1/20* (2006.01)
*G06T 1/60* (2006.01)
*G06F 9/48* (2006.01)
*G06F 12/0895* (2016.01)

(52) U.S. Cl.
CPC .......... *G06F 9/485* (2013.01); *G06F 12/0895* (2013.01); *G06T 1/20* (2013.01); *G06T 1/60* (2013.01)

(58) Field of Classification Search
CPC ... G06T 1/20; G06T 1/60; G06F 9/485; G06F 12/0895
USPC ................................................ 345/501, 557
See application file for complete search history.

(56) References Cited

U.S. PATENT DOCUMENTS

| | | | | |
|---|---|---|---|---|
| 10,102,149 B1* | 10/2018 | Appu | ................. | G06F 13/4022 |
| 10,467,724 B1* | 11/2019 | Havlir | ................. | G06F 9/3885 |
| 2008/0079744 A1* | 4/2008 | Xu | ............................ | G06T 1/60 345/552 |
| 2011/0074802 A1* | 3/2011 | Nickolls | ................... | G06T 1/60 345/564 |
| 2012/0017062 A1* | 1/2012 | Goel | ................... | G06F 15/8007 712/30 |
| 2016/0364828 A1* | 12/2016 | Valerio | ............... | G06F 9/30178 |
| 2019/0206110 A1* | 7/2019 | Gierach | ................ | G06T 15/005 |

* cited by examiner

*Primary Examiner* — Jacinta M Crawford

(57) ABSTRACT

One or more shader processor inputs (SPIs) provide work items from a thread group for execution on one or more shader engines. A command processor selectively dispatches the work items to the SPIs based on a size of the thread group and a format of cache lines of a cache implemented in the one or more shader engines. The command processor operates in a tile mode in which the command processor schedules the work items in multidimensional blocks that correspond to the format of the cache lines. In some cases, the format of the cache lines is determined by a texture surface format and a swizzle mode for storing texture data. The SPIs (or corresponding drivers) adaptively select wave size, tile size, and wave walk mode based on thread group size, UAV surface format. The SPIs adaptively launch and schedule waves in a thread group based on selected file size, wave walk mode, and wave size to improve cache locality, reduce memory access, and create address pattern to improve memory efficiency.

20 Claims, 13 Drawing Sheets

ADAPTIVE THREAD GROUP DISPATCH

BACKGROUND

Graphics processing units (GPUs) and other multi-threaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores. The processing elements are therefore referred to as SIMD units. In some architectures, multiple SIMD units are incorporated into a compute unit, multiple compute units are incorporated into a workgroup processor (WGP), multiple WGPs are incorporated into a shader array, and multiple shader arrays are incorporated into a shader engine. A command processor schedules and dispatches compute dispatch requests with SIMD instructions by sending requests to one or more shader processor inputs (SPIs), which distributes the workload over the available shader engines.

A hierarchical execution model defines a kernel of instructions that are executed using different data sets. The execution model corresponds to the processor architecture. For example, a three-dimensional (3D) grid of workgroups is partitioned into 3D workgroups or thread groups that include one or more wavefronts. The size of the 3D workgroups is determined by an application that is generating the 3D grid, e.g., a game executing on the GPU. Each wavefront includes one or more threads (also referred to herein as work items or streams) and the number of threads in the wavefront is constrained by the available hardware resources. The command processor decomposes dispatch requests to form ordered sequences of requests to execute thread groups (or workgroups). The command processor distributes the thread group requests to the SPIs associated with different shader engines, e.g., on a round-robin basis to support workload balancing among the shader engines and compute units. For example, the command processor dispatches a first thread group to a first shader engine, a second thread group to a second shader engine, a third thread group to a shader engine, etc. In display mode, the SPI scans the thread group sequentially by unrolling the 3D indices of the threads. The SPI then dispatches waves including the threads to the SIMD units in the shader engine in the scanned order.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 12 is a block diagram of a tile mode according to some embodiments.

FIG. 13 is a block diagram of a Morton mode according to some embodiments.

DETAILED DESCRIPTION

Figure 1:
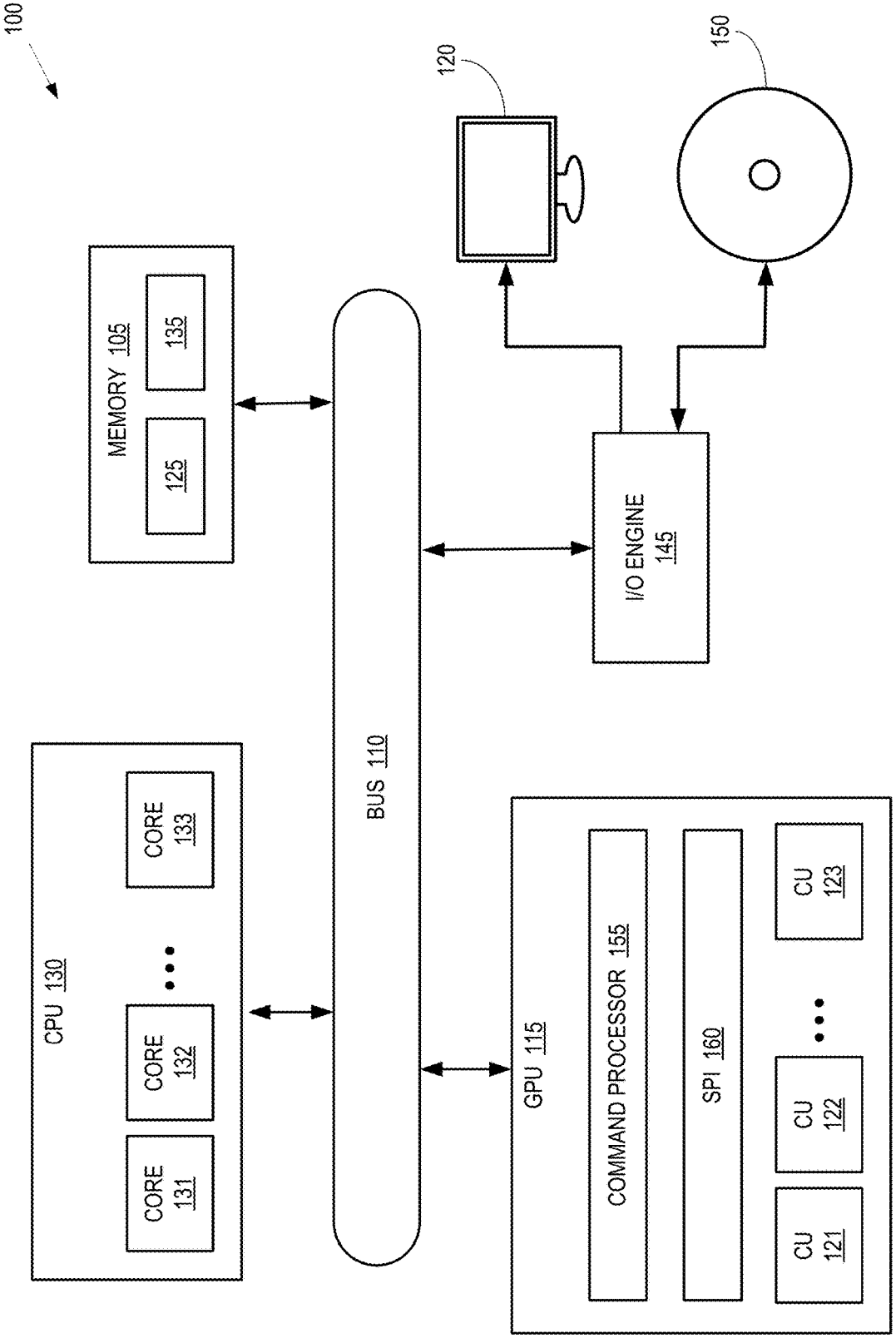
FIG. 1 is a block diagram of a processing system that implements adaptive thread group dispatching according to some embodiments.

Conventional techniques for dispatching waves, which are typically based on load-balancing considerations, have several disadvantages. For example, the command processor and SPI distribute thread groups from the workload evenly among the different compute units even if the workload is relatively small. Load-balancing of the small workload leads to poor cache locality and cache thrashing because different compute units use different caches. Furthermore, small workloads can be executed on one compute unit (or a small number of the available compute units) without performance degradation, which allows the possibility of reducing power consumption. However, distributing the small workload evenly among all the available compute units prevents the power management algorithm from disabling some of the compute units that are not necessary to execute the relatively small workload. For another example, the SPI walks through the thread indices in a thread group in order and launches threads in a thread group having consecutive indices to the same compute unit. The waves therefore include a one-dimensional (1D) set of threads and each wave accesses multiple cache lines that may have two-dimensional (2D) or 3D formats. The mismatch between the geometry of the scheduled waves and the texture access pattern for the cache lines produces partial writes of the cache lines. The partial writes incur a large cost in memory bandwidth and increased latency.

FIGS. 1-13 disclose embodiments of a command processor in a processing system that performs adaptive wave scheduling to selectively dispatch sets of threads from one or more thread groups to shader processor inputs (SPIs) for execution on one or more shader engines based on a size of the thread groups and a format of cache lines in caches implemented in the shader engines. The command processor implements a tile mode and a display mode to schedule the sets of threads in multi-dimensional blocks that correspond to the format of the cache lines. For example, the command processor configures the tile mode to dispatch 2×2 blocks of threads having consecutive indices. In some embodiments, the format of the cache line is determined by a texture surface format and a swizzle mode, which are determined by the hardware architecture and associated drivers. The command processor (or GPU driver) therefore configures a wave size and a tile mode based on the texture surface format and swizzle mode implemented in the processing system. The command processor then groups threads into sets based on the thread group size, the wave size and the tile mode. For example, to improve cache locality and reduce cache thrashing, the command processor adds threads having consecutive thread indices to thread group blocks (which are also referred to as thread group sets) to ensure that continuous thread groups are provided to the same SPI and compute unit. For another example, to support power management, threads in a relatively small batch are added to thread group blocks that are provided to the same SPI for scheduling on a subset of the available shader engines, thereby allowing the remaining shader engines to be placed in a low-power mode.

FIG. 1 is a block diagram of a processing system 100 that implements adaptive thread group dispatching according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

A command processor 155 in the GPU 115 (or a corresponding driver) implements adaptive thread group scheduling. Some embodiments of the command processor 155 (or corresponding driver) implement a thread group controller that adaptively selects a thread group block size, a wave size, and a thread group walk mode based on a grid size and thread group size. The command processor 155 also includes circuitry to adaptively dispatch and schedule the thread group block in the grid based on the thread group walk mode. The command processor 155 schedules thread groups or sets of thread groups to one or more shader processor inputs (SPIs) 160. As discussed herein, the command processor 155 performs its tasks adaptively to reduce power and improve the cache hit rate and memory access pattern.

The SPI 160 (or corresponding driver) schedules thread groups and the associated waves to different CU 121-123 and SIMD (not shown in FIG. 1 in the interest of clarity). Some embodiments of the SPI 160 (or corresponding driver) implement a wave controller that adaptively selects a wave size, a tile size, and a wave walk mode based on the thread group size and a source descriptor such as an unordered access view (UAV) source descriptor. The SPI 160 also includes circuitry to adaptively launch and schedule waves in a thread group based on a selected tile size, wave walk mode, and wave size. As discussed herein, the SPI 160 performs its tasks adaptively to improve the cache hit rate and memory access pattern.

To implement adaptive wave scheduling, the command processor 155 selectively dispatches work items (also referred to herein as threads) in a thread group to the SPI 160 based on a size of the thread group and a format of cache lines of a cache implemented in a corresponding shader engine in the graphics pipeline. When operating in a tile mode, the command processor 155 schedules the work items in multidimensional blocks that correspond to the format of the cache lines. Some embodiments of the cache implement cache lines using a two-dimensional m×n format. In that case, the command processor 155 schedules the work items in two-dimensional k×l blocks, m being an integer multiple of k and l being an integer multiple of n However, the cache lines can be implemented in other dimensionalities including three-dimensional blocks.

In some embodiments, the format of the cache lines is determined by a texture surface format and a swizzle mode for storing texture data. A swizzle mode describes how a resource has its elements organized in memory and therefore specifies how virtual addresses are calculated from the Cartesian coordinate for accessing specific elements of an image/texture resource type.

Figure 2:
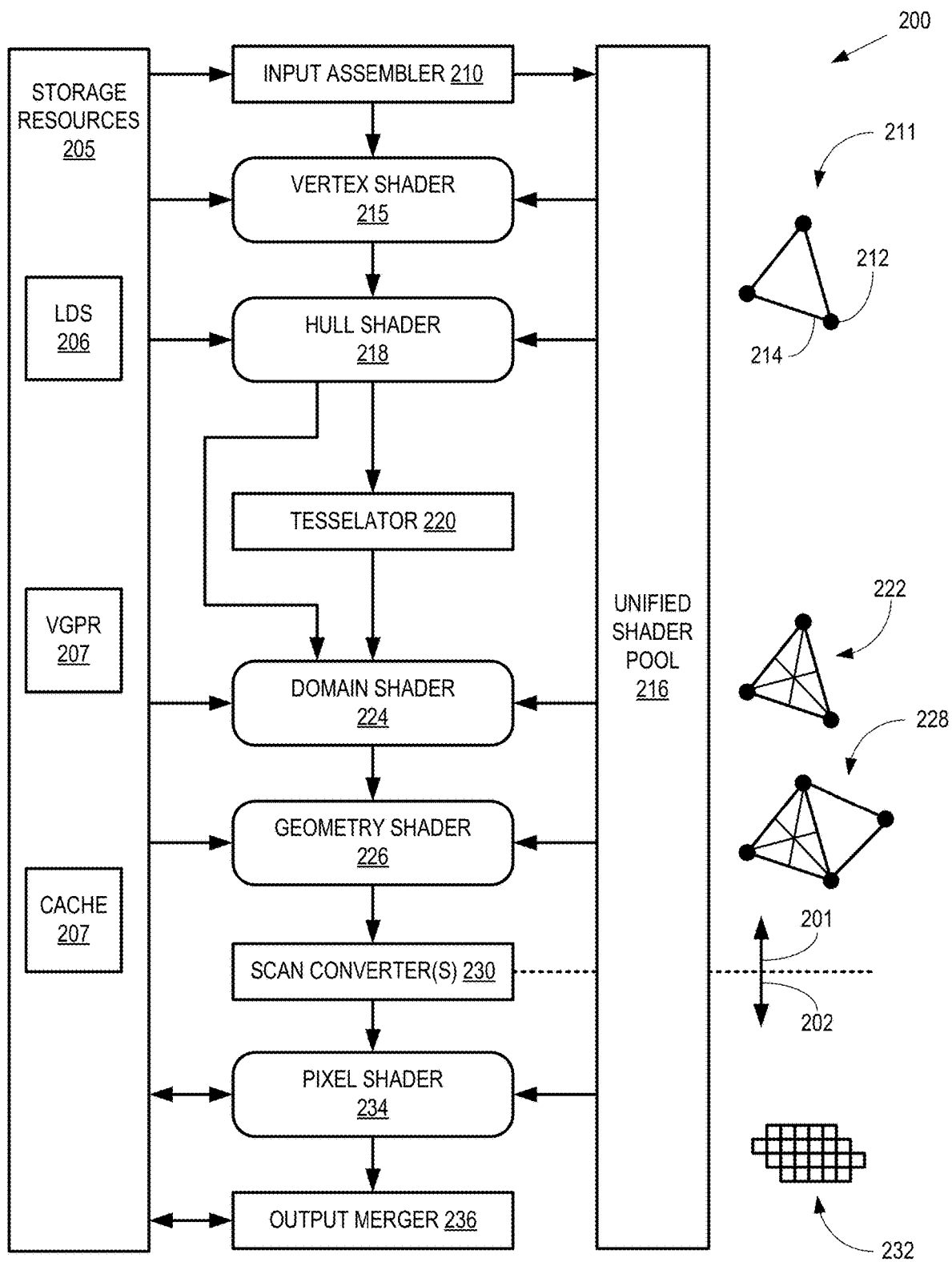
FIG. 2 depicts a graphics pipeline that performs adaptive wave scheduling of work items in thread group blocks to shader engines according to some embodiments.

FIG. 2 depicts a graphics pipeline 200 that performs adaptive wave scheduling of work items in thread group blocks to shader engines according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include load data store (LDS) 206 circuitry that is used to store data, vector general-purpose registers (VGPRs) to store register values used during rendering by the graphics pipeline 200, and caches 207 that are used to cache frequently used data for the shader engines in the graphics pipeline 200. The storage resources 205 are implemented using some embodiments of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 203 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shader engines such as the vertex shader 215 implement massive single-instruction-multiple-data (SIMD) processing so that multiple vertices are processed concurrently. The graphics pipeline 200 implements a unified shader model so that all the shader engines included in the graphics pipeline 200 have the same execution platform on the shared massive SIMD compute units. The shader engines, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors provided to the tessellator 220 by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tessellation factors. A geometry shader 226 receives an input primitive and outputs up to four primitives that are generated by the geometry shader 226 based on the input primitive. In the illustrated embodiment, the geometry shader 226 generates the output primitives 228 based on the tessellated primitive 222.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shader engines in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
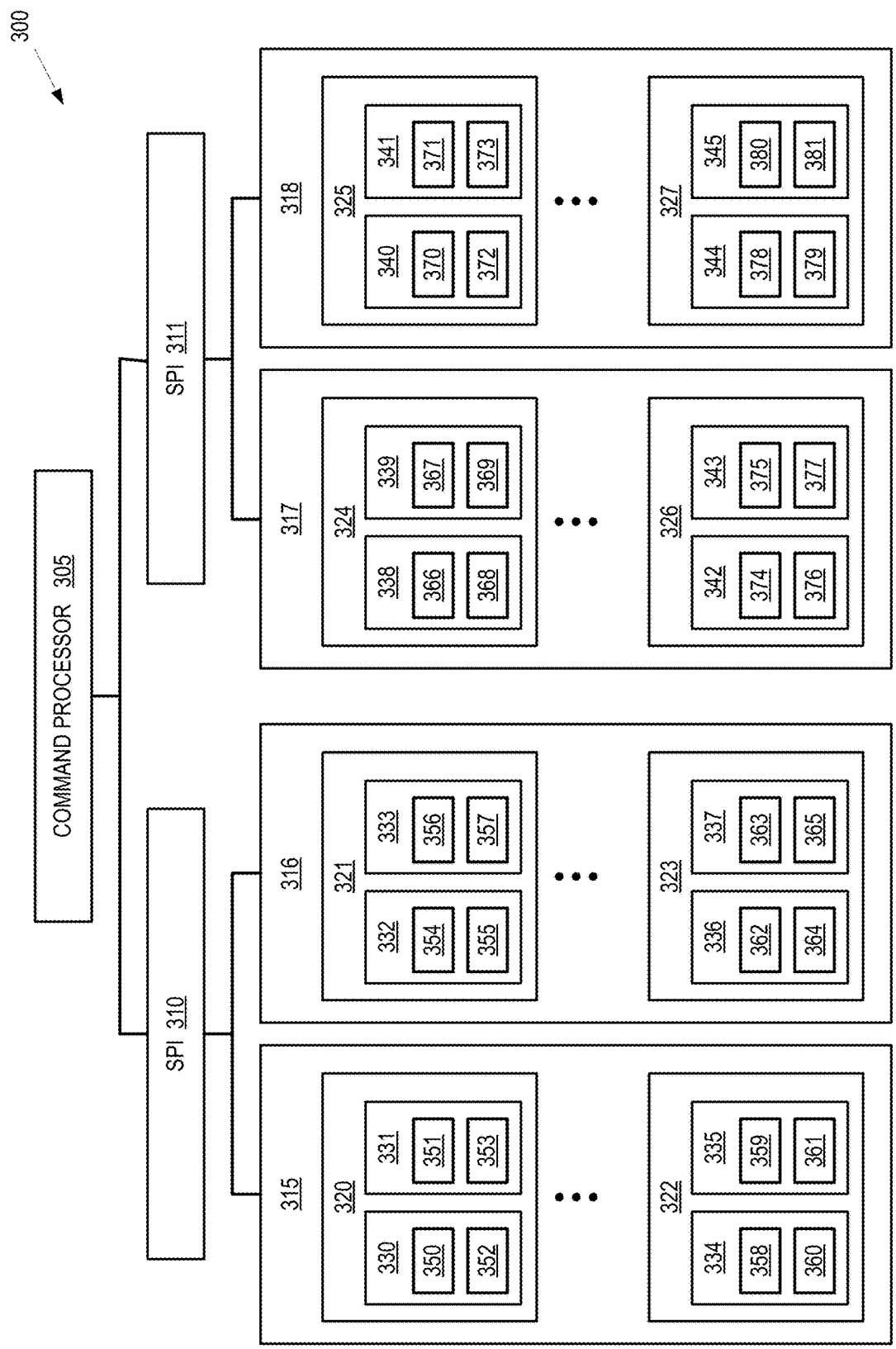
FIG. 3 is a block diagram of a processing system that performs adaptive wave scheduling according to some embodiments.

FIG. 3 is a block diagram of a processing system 300 that performs adaptive wave scheduling according to some embodiments. The processing system is used to implement some embodiments of the processing system 100 shown in FIG. 1 and the graphics pipeline 200 shown in FIG. 2.

The processing system 300 includes a command processor 305 that decomposes dispatch requests to ordered sequences of thread group requests. The command processor 305 can operate in a display mode or a tile mode. When operating in the tile mode, the command processor 305 decomposes the dispatch requests into tile-ordered sequences of thread group requests. As discussed herein, dispatching the tile-ordered sequences of thread group requests in corresponding thread group blocks can reduce cache thrashing operations that are performed due to non-optimal address patterns that occur when dispatching thread group requests in display mode, as discussed herein. The command processor 305 dispatches the thread group blocks to the SPIs 310, 311. In some embodiments, the command processor 305 uses a round-robin algorithm to distribute the thread group blocks among the SPIs 310, 311. Each set of thread groups is dispatched to a corresponding SPI 310, 311 before switching to a different one of the SPI 310, 311 for a different set of thread groups.

The SPI 310, 311 schedule wave groups to corresponding shader arrays 315, 316, 317, 318, which are collectively referred to herein as "the shader arrays 315-318." In the illustrated embodiment, the shader arrays 315-318 include workgroup processors 320, 321, 322, 323, 324, 325, 326, 327 (collectively referred to herein as "the workgroup processors 320-327") that implement one or more compute units 330, 331, 332, 333, 334, 335, 336, 337, 338, 339, 340, 341, 342, 343, 344, 345 (collectively referred to herein as "the compute units 330-345"). Each of the compute units 330-345 implement single-instruction-multiple-data (SIMD) processing elements 350-381.

Dispatching continuous or sequential thread groups in a set to the same SPI 310, 311 (as well as the same compute unit) guarantees that the thread groups maintain cache locality, which reduces cache thrashing. For example, a set of continuous thread groups that is dispatched from the command processor 305 to the SPI 310 can be scheduled on the compute unit 330 so that the work items in the continuous thread groups share the cache implemented in (or associated with) the compute units 330. In some embodiments, thread groups from a small dispatch batch (e.g., a batch that includes less than a threshold number of thread groups or work items) are dispatched to the same SPI 310, 311 so that they are executed on the same compute unit or a subset of the available compute units. The remaining compute units can therefore be placed in a low-power mode to conserve power in the processing system 300. For example, if the thread groups from a dispatch batch are aggregated into a single set of thread groups that is dispatched to the SPI 310, the SPI 310 can schedule the thread groups in the set to the compute units 330, 331. The other compute units 332-337 associated with the SPI 310 are then placed in a low-power mode while the thread groups in the set are executing on the compute units 330, 331.

Figure 4:
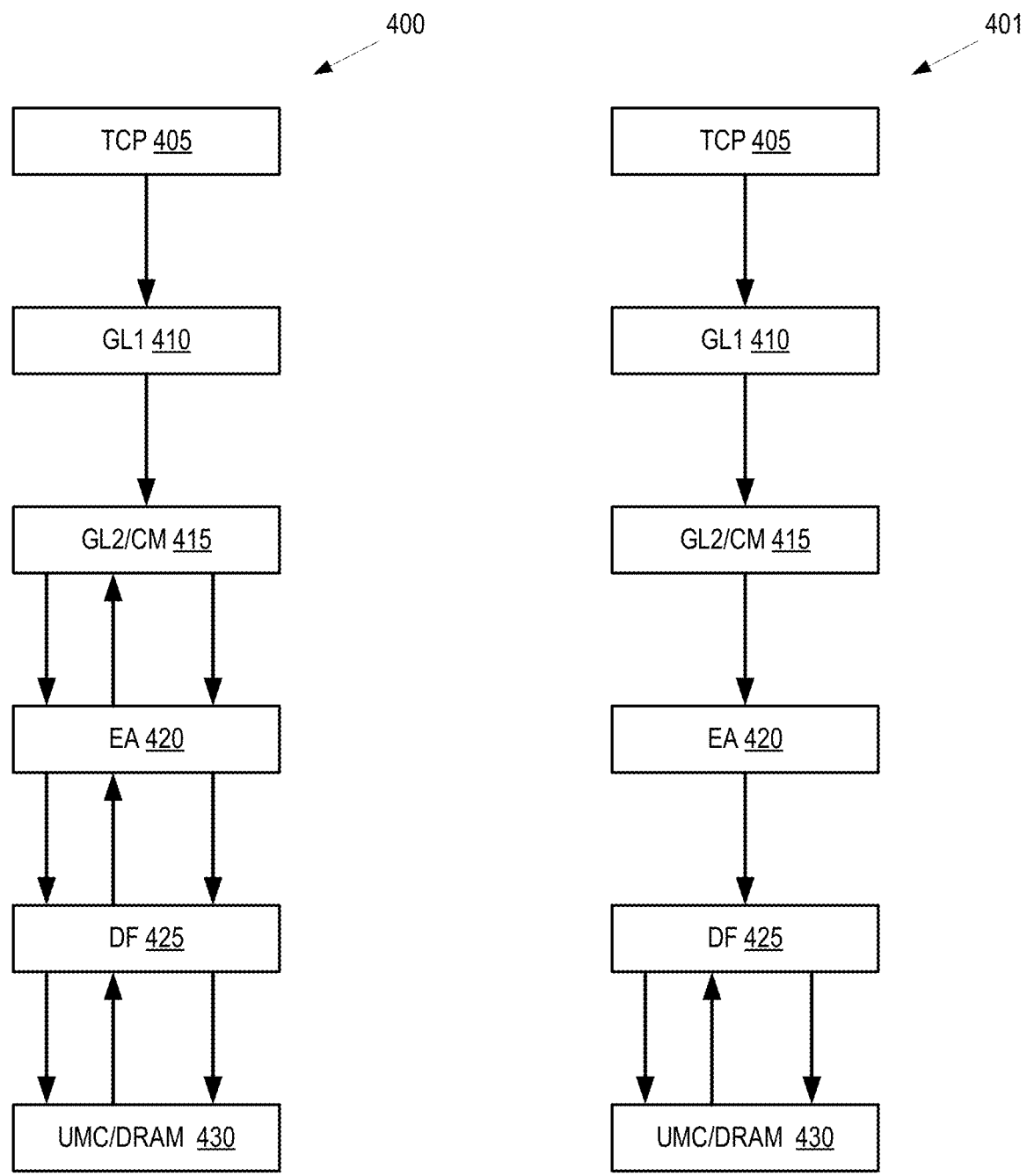
FIG. 4 is a block diagram that illustrates the impact of a compressed partial write operation and an uncompressed partial write operation according to some embodiments.

FIG. 4 is a block diagram that illustrates the impact of a compressed partial write operation 400 and an uncompressed partial write operation 401 according to some embodiments. A partial write is an address access pattern that causes low memory efficiency. As used herein, the term "partial write" refers to the process of updating part of a cache line, e.g., by reading an entire cache line back from memory so that new data can be updated to the part of the cache line, and then writing the entire cache line back to memory. For example, if there is a cache write to one byte of an eight byte cache line, the conventional practice is to read the entire cache line back from memory in response to a partial cache write and update one byte of the cache line with an eight byte line retrieved from memory. The entire updated cache line is then written back to the memory. Thus, a partial write generates excess reading and writing operations.

In the compressed partial write operation 400, a texture cache pipe (TCP) 405 writes a cache line back to a graphics level 1 cache (GL1) 410 in response to a cache miss to a portion of the cache line. The GL1 cache 410 forwards the write request to a graphics level 2 cache (GL2) 415, which includes a compression module (CM). The write request also triggers the exchange of data with an efficiency arbiter (EA) 420, a data fabric (DF) 425, and a unified memory controller (UMC)/DRAM 430. Due to compression (at the CM) of the cache line data that is written back to the DRAM 430 and decompression of the data that is read into the cache line, multiple data exchanges are performed between the GL2/CM 415, EA 420, DF 425, and UMC/DRAM 430. Many of these exchanges are performed for data that is unchanged (or unnecessarily modified) in the partially written cache line, thereby unnecessarily increasing the bandwidth consumption and processing time. The overhead required to perform the uncompressed partial write operation 401 is lower than for the compressed partial write operation 400, but it still represents an unnecessary use of memory bandwidth and processing power.

Figure 5:
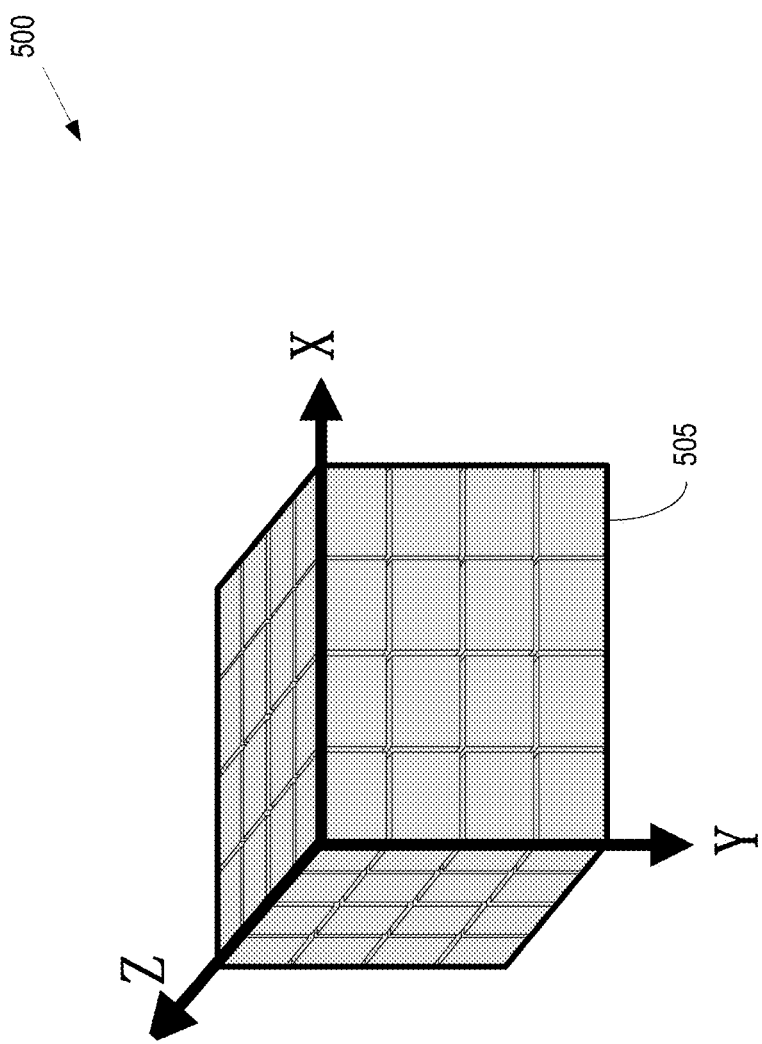
FIG. 5 is a block diagram of a block of work items according to some embodiments.

FIG. 5 is a block diagram of a block 500 of work items 505 according to some embodiments. The work items 505 are distributed in a 3D block in the illustrated embodiment, although any dimensionality can be used. The indices of the work items 505 are used to indicate positions along the X, Y, and Z axes of the block 500. An SPI dispatches the work items 505 in thread groups. In some embodiments, the SPI generates an index for each thread (e.g., each work item 505) and then generates waves that include one or more work items 505. The SPI dispatches the waves to corresponding processor elements such as SIMD units. Some embodiments of the SPI select indices of the work items 505 in a round-robin manner. The SPI generates the indices for a thread group by incrementing and repeating patterns of X, Y, and Z index terms for each thread in a thread group. The index generation algorithm unrolls each dimension, X then Y then Z, incrementing each component when the terms below the component reach their specified size.

Figure 6:
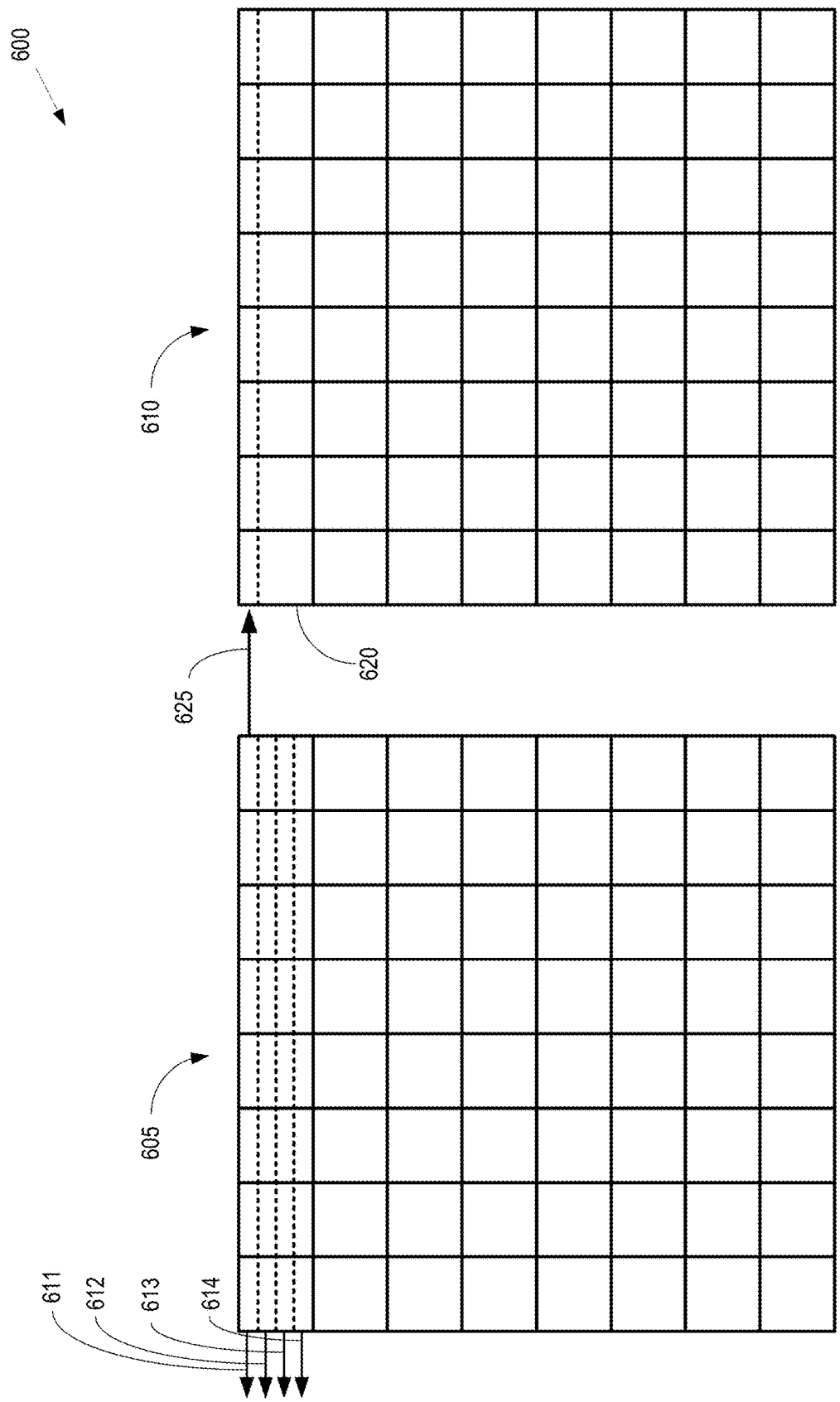
FIG. 6 is a block diagram of a mapping of a raster scan to a texture cache according to some embodiments.

FIG. 6 is a block diagram of a mapping 600 of a raster scan 605 to a texture cache 610 according to some embodiments. In the illustrated embodiment, the raster scan 605 is an array of 32×32 pixels that are dispatched for processing in waves. For example, a first line of 32×1 pixels is dispatched from the raster scan 605 in a first wave 611, a second line of 32×1 pixels is dispatched from the raster scan 605 in a second wave 612, a third line of 32×1 pixels is dispatched from the raster scan 605 in a third wave 613, and a fourth line of 32×1 pixels is dispatched from the raster scan 605 in a fourth wave 614.

During processing, the waves 611-614 access data that is stored in the texture cache 610. However, the cache lines of the texture cache 610 are stored in a 4×4 pixel format, e.g., as shown for the first cache line 620 of the texture cache 610. The wave 611 therefore maps to a set of eight cache lines in the texture cache 610, as indicated by the arrow 625. Consequently, the mapping 600 of the waves 611-614 (and other waves dispatched from the raster scan 605) to the texture cache 610 generates a large number of partial writes. For example, a first portion of the wave 611 is mapped to the cache line 620 but only the top 4×1 pixels in the 4×4 pixel format of the cache line 620 includes data used by the wave 611. The remaining 4×3 set of pixels in each cache line are not used and create partial writes.

Figure 7:
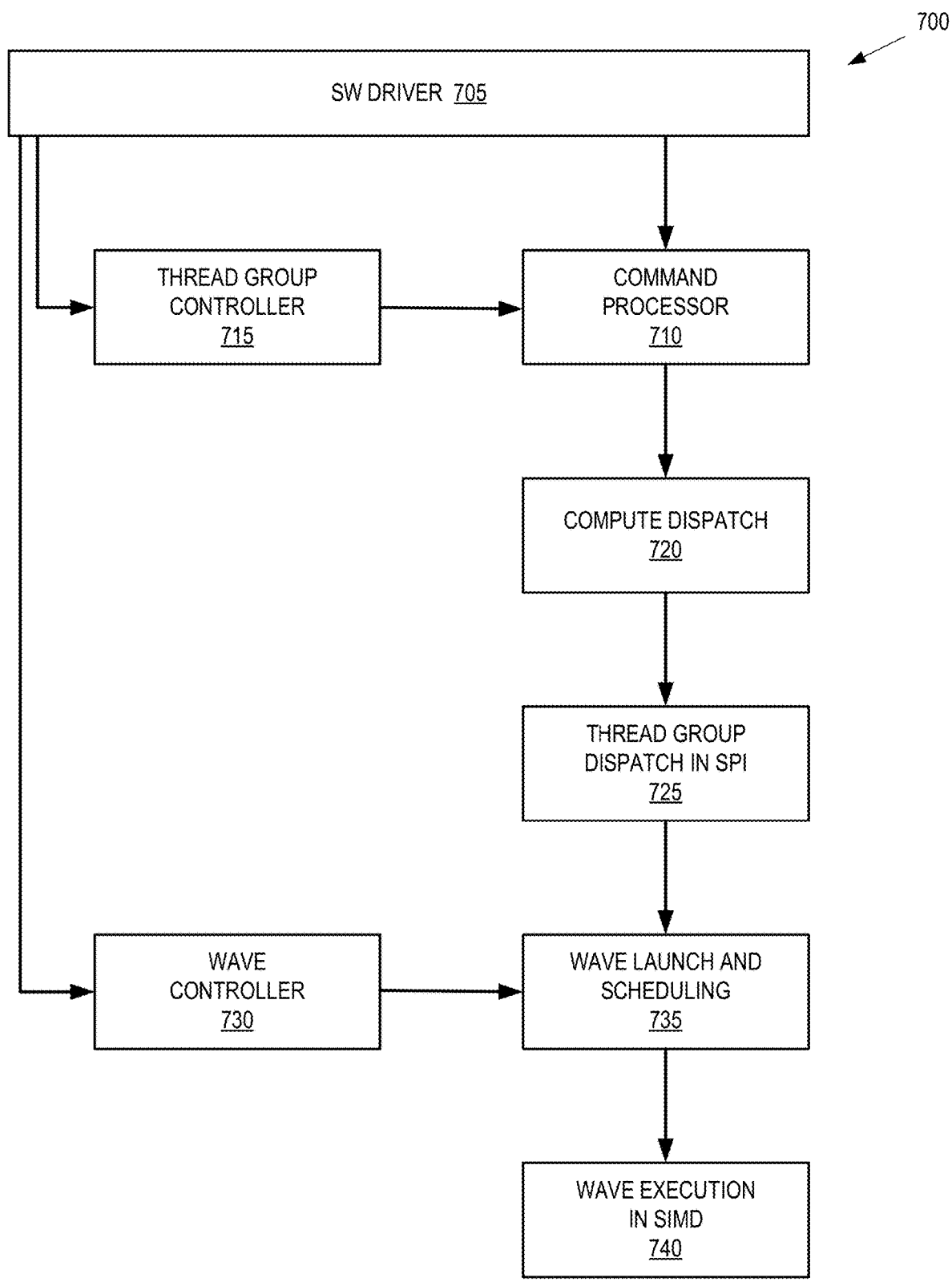
FIG. 7 is a block diagram of a processing system that performs adaptive thread group dispatching according to some embodiments.

FIG. 7 is a block diagram of a processing system 700 that performs adaptive thread group dispatching and adaptive wave scheduling according to some embodiments. The processing system 700 includes a software driver 705 that determines parameters for processing thread groups such as a waves size (Wave16, Wave32, Wave48, Wave64, and the like) and a service resource descriptor for services including a shader resource view (SRV) or an unordered access view (UAV). An SRV is also known as a texture. An SRV is attached to a shader core for sampling and typically is limited to read-only capability. A UAV is a read/write version of an SRV.

In some embodiments, thread group processing parameters include a surface format that is defined by a number of bits per pixel (BPP) such as 16 BPP, 32 BPP, 64 BPP, 96

BPP, or 128 BPP. The software driver also sets a swizzle mode for the data. As discussed herein, this information is used to derive a cache line pattern of the associate cache. For example, if the cache line size is 128 bytes, the format is 32 BPP, and the swizzle mode is R, the data in a cache line is distributed in a 4×8 pattern so that there are four pixels along the x-axis and eight pixels along the y-axis. The software driver 705 also accesses information indicating a grid size for a thread group, which in the illustrated embodiment is three-dimensional (TGx, TGy, TGz), and information indicating a thread group size (Tx, Ty, Tz), which is generated by an application and may be updated by the software driver 705 in some embodiments.

The software driver 705 provides information indicating wave parameters including the wave size, grid size, thread group size, surface format, and swizzle mode to a command processor 710. The software driver 705 also provides information indicating the grid size and the thread group size to a thread group controller 715. The thread group controller 715 generates a thread group block size and a thread group walk mode based on the grid size and the thread group size, e.g., according to the method 800 disclosed in FIG. 8. The thread group controller 715 and provides the thread group block size and the thread group walk mode to a compute dispatch control block 720, which also receives the wave parameters from the command processor 710.

The compute dispatch control block 720 uses the thread group walk mode to scan a workgroup of pixels that are dispatched in a grid. As discussed herein, the thread group walk modes include a display mode and a tile mode that supports improved cache locality and memory address patterns, as well as power saving management algorithms. The compute dispatch control block 720 dispatches thread group blocks to shader engines using algorithms such as round-robin dispatch. The grid size and the thread group size (or workgroup size) are set by the application and may be updated by the software driver 705, as discussed herein. Conventionally, the basic unit of compute dispatch is one thread group. However, some embodiments of the compute dispatch control block 720 pack multiple small thread groups into one thread group block that forms the basic unit of compute dispatch. For example, multiple thread groups are packed into a single thread group block if the size of the thread groups is smaller than a threshold such as 256 or 1024 threads. The thread group block is sent to a single compute unit in a shader engine, which enables wave execution to create better memory address patterns to the cache or memory to improve efficiency. The shape of the thread group block may be two dimensional or three-dimensional, e.g., as disclosed in FIG. 9.

A shader processor input (SPI) 725 then dispatches thread groups based on information received from the compute dispatch control block 720. In some embodiments, the SPI 725 dispatches the thread group blocks using a round-robin algorithm that distributes the thread group blocks over workgroup processors in shader engines or shader arrays in the worker processor. The SPI dispatches the thread group blocks based on availability of resources such as register files, local data share (LDS) memory, wave resource lots, or other resources of the destination SIMD.

A wave controller 730 receives information indicating the thread group size and a UAV surface resource descriptor from the software driver 705. The tile size is defined so that a tile fully covers one wave, e.g., one Wave32 or Wave64. Read or write requests issued by a shader instruction in the waves therefore fully covers one cache line. The tile size is determined based on the thread group size, the wave size, and the cache line size.

Table 1 defines thread group walk modes, wave walk modes, and tile sizes for a thread group size of 32×32.

TABLE 1

| BPP (Bits Per Pixel) | Swizzle Type | 128B Shape (X × Y × Z) | Thread Group Walk Mode | Wave Walk Mode | Tile Size (X × Y) |
|---|---|---|---|---|---|
| 8 | S/D/R | 16 × 8 | Display | Tile | 8 × 8 |
|   | S3/D3 | 8 × 4 × 4 | Display | Tile | 8 × 8 |
| 16 | S/D/R | 8 × 8 | Display | Tile | 8 × 8 |
|   | S3/D3 | 4 × 4 × 4 | Display | Tile | 8 × 8 |
| 32 | S/D/R | 4 × 8 | Display | Tile | 8 × 8 |
|   | S3/D3 | 4 × 4 × 2 | Display | Tile | 8 × 8 |
| 64 | S | 4 × 4 | Display | Tile | 16 × 4 or 8 × 8 |
|   | D/R | 8 × 2 | Display | Tile | 16 × 4 or 8 × 8 |
|   | S3/D3 | 4 × 2 × 2 | Display | Tile | 16 × 4 or 8 × 8 |
| 128 | S | 2 × 4 | Display | Tile | 16 × 4 or 8 × 8 |
|   | D/R | 4 × 2 | Display | Tile | 16 × 4 or 8 × 8 |
|   | S3/D3 | 2 × 2 × 2 | Display | Tile | 16 × 4 or 8 × 8 |

Table 2 shows thread group walk modes, wave walk modes, and tile sizes for a thread group size of 8×8:

TABLE 2

| BPP | Swizzle Type | 128B Shape (X × Y × Z) | Thread Group Walk Mode | Wave Walk Mode | Tile Size (or Wave Block) (X × Y) |
|---|---|---|---|---|---|
| 8 | S/D/R | 16 × 8 | Tile 2 × 2/2 × 4 | Display | 8 × 8 |
|   | S3/D3 | 8 × 4 × 4 |   |   |   |
| 16 | S/D/R | 8 × 8 | Tile 2 × 2 | Display | 8 × 8 |
|   | S3/D3 | 4 × 4 × 4 |   |   |   |
| 32 | S/D/R | 4 × 8 | Tile 2 × 2 | Display | 8 × 8 |
|   | S3/D3 | 4 × 4 × 2 |   |   |   |
| 64 | S | 4 × 4 | Tile 2 × 2 | Display | 8 × 8/8 × 4 |
|   | D/R | 8 × 2 | Tile 2 × 2 | Display | 8 × 8/8 × 4 |
|   | S3/D3 | 4 × 2 × 2 |   |   |   |
| 128 | S | 2 × 4 | Tile 2 × 2 | Display | 8 × 8/8 × 4 |
|   | D/R | 4 × 2 | Tile 2 × 2 | Display | 8 × 8/8 × 4 |
|   | S3/D3 | 2 × 2 × 2 |   |   |   |

The wave size can be set to 16, 32, 64, or other values to indicate a number of threads in the wave. Each thread corresponds to one work item.

A wave launch and scheduling block 735 scans the wave using the wave walk mode determined by the wave controller 730. In some embodiments, the wave can be scanned using three walk modes: display mode, tile mode, and Morton mode, as shown in FIGS. 10-13. The SPI scans the thread group or thread group block to launch the waves and schedule the waves to different SIMD in the compute unit or worker processor based on the wave walk mode. The waves are then executed in a SIMD module 740, which is implemented using some embodiments of the SIMD processing elements 350-381 shown in FIG. 3.

In the illustrated embodiment, the command processor 710, dispatch control block 720, thread group dispatch in SPI 725, wave launch and scheduling 735, and wave execution in SIMD 740 are implemented in hardware. The thread group controller 715 and the wave controller 730 can be implemented in hardware, firmware, software, or a combination thereof.

Figure 8:
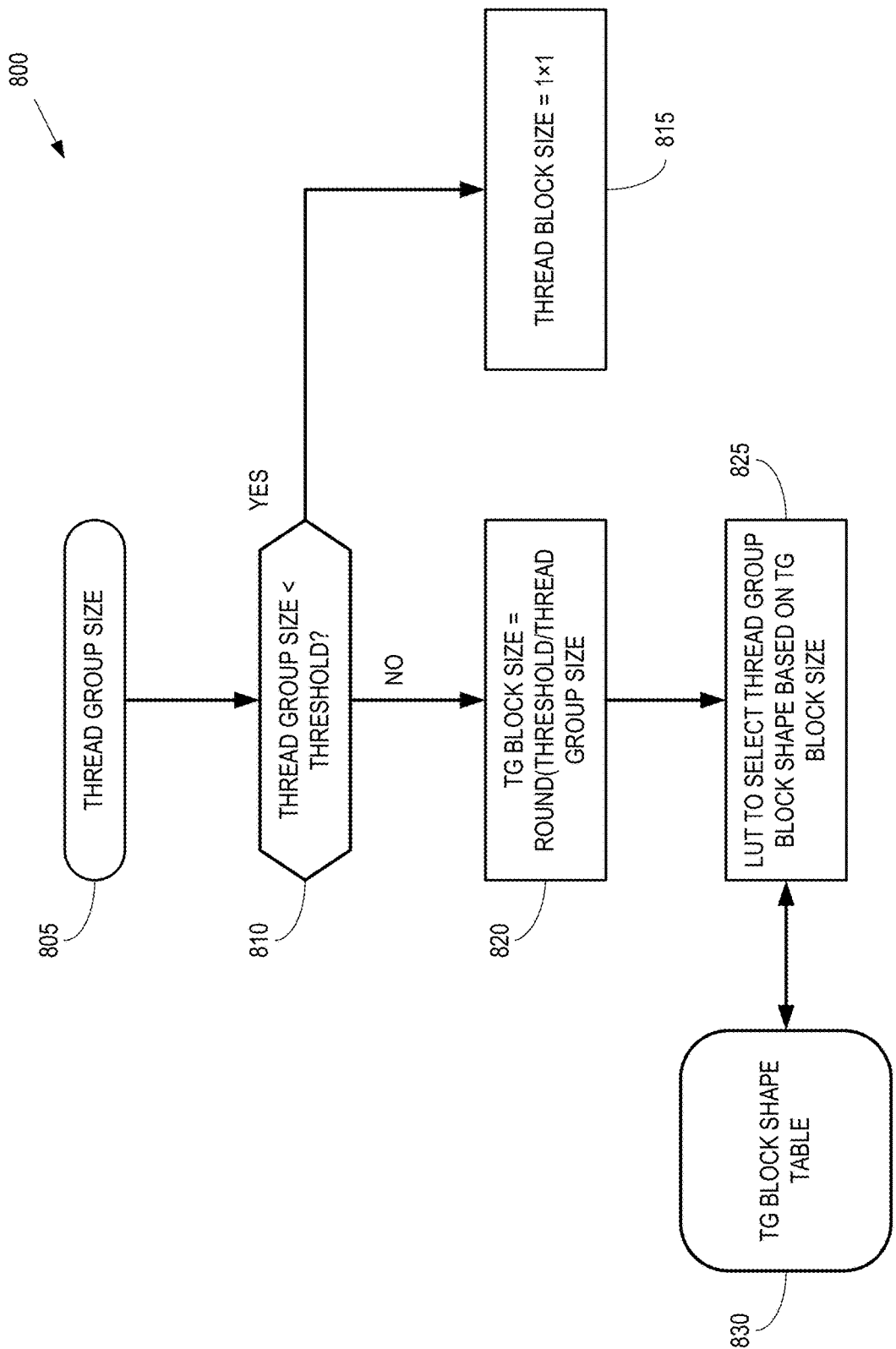
FIG. 8 is a flow diagram of a method of determining a shape of a thread group block according to some embodiments.

FIG. 8 is a flow diagram of a method 800 of determining a shape of a thread group block according to some embodiments. The method 800 is implemented in a thread group controller such as some embodiments of the thread group controller 715 in the processing system 700 shown in FIG.

7. Input 805 to the method 800 includes a thread group size for the thread groups that are being processed in the wave.

At decision block 810, the thread group controller determines whether the thread group size is less than a threshold, such as 256 or 1024 threads per group. If so, the method 800 flows to the block 815 and the thread group controller sets the thread block size to a default size such as a 1×1 thread group block. If the thread group size is larger than the threshold, the method 800 flows to the block 820.

At block 820, the thread group controller sets the thread group block size based on a ratio of the threshold to the thread group size. In the illustrated embodiment, the thread group controller applies a rounding operation to the ratio of the threshold to the thread group size to determine an integer value of the thread group block size.

At block 825, the thread group controller accesses a thread group block shape lookup table 830 that is indexed based on the thread group block size. The thread group controller then determines a thread group block shape based on the thread group block size and the information in the table 830.

Figure 9:
FIG. 9 is a block diagram of examples of thread group block shapes according to some embodiments.

FIG. 9 is a block diagram of examples of thread group block shapes according to some embodiments. The first shape 900 is a two-dimensional 2×2 thread group block that includes entries for four thread groups. The second shape 901 is a two-dimensional 2×4 thread group block that includes entries for eight thread groups. The third shape 902 is a two-dimensional 4×4 thread group block that includes entries for sixteen thread groups. Other shapes can also be used for the thread group blocks including 1×1, 2×1, 2×1, 4×2, and the like. In some embodiments, the shapes available for thread group blocks include 3D shapes such as 2×4×1 and the like.

Table 3 illustrates an example of relationships between the texture format, a swizzle type, a shape of a cache line, and a number of pixels.

TABLE 3

| Format (BPP) | Swizzle Type | 128B Shape (X × Y × Z) | Pixels |
|---|---|---|---|
| 8 | S/D/R | 16 × 8 | 128 |
|   | S3/D3 | 8 × 4 × 4 | 128 |
| 16 | S/D/R | 8 × 8 | 64 |
|   | S3/D3 | 4 × 4 × 4 | 64 |
| 32 | S/D/R | 4 × 8 | 32 |
|   | S3/D3 | 4 × 4 × 2 | 32 |
| 64 | S | 4 × 4 | 16 |
|   | D/R | 8 × 2 | 16 |
|   | S3/D3 | 4 × 2 × 2 | 16 |
| 128 | S | 2 × 4 | 8 |
|   | D/R | 4 × 2 | 8 |
|   | S3/D3 | 2 × 2 × 2 | 8 |

Figure 10:
FIG. 10 is a block diagram of arrangements of threads that are used to define thread group blocks in a display mode and a 2×2 tile mode according to some embodiments.
Figure 10:

FIG. 10 is a block diagram of arrangements of thread groups that are used to define thread group blocks in a display mode 1000 and a 2×2 tile mode 1001 according to some embodiments. In the display mode 1000, the thread group in grid are arranged in order from left to right and top to bottom. For example, the top row of thread groups in the display mode 1000 includes the thread group 0, 1, 2, 3, 4, 5, 6, 7. In the 2×2 tile mode 1001, the thread groups are arranged so that sequences of thread groups in the grid are grouped in 2×2 tiles. For example, the thread group 0, 1, 2, 3 are arranged into a 2×2 tile at the upper leftmost corner of the thread group arrangement in the 2×2 tile mode 1001.

Figure 11:
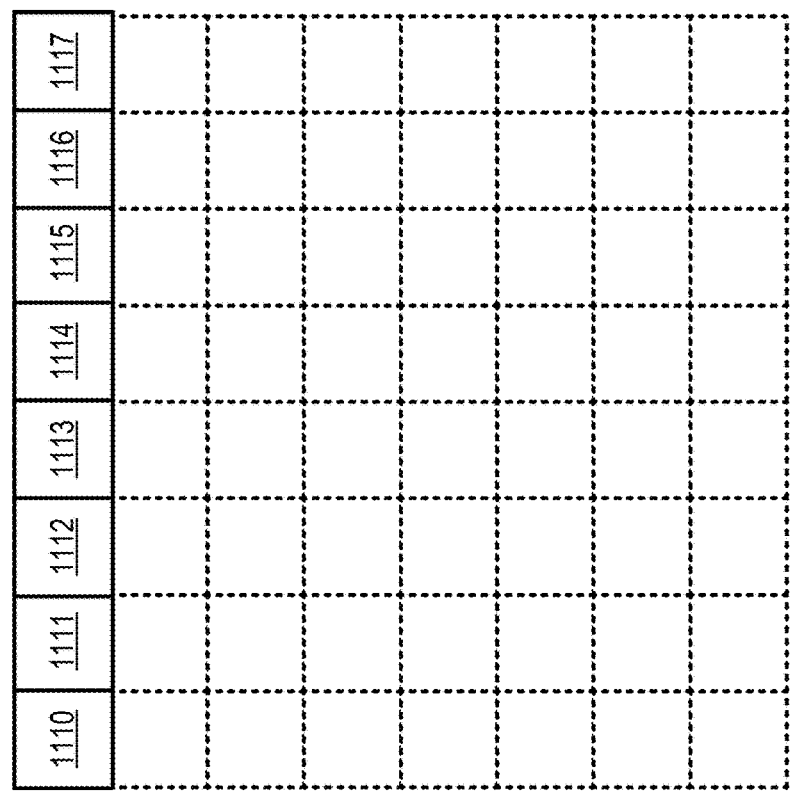
FIG. 11 is a block diagram of waves dispatched from a thread group and a corresponding access pattern for a texture cache according to some embodiments.
Figure 11:
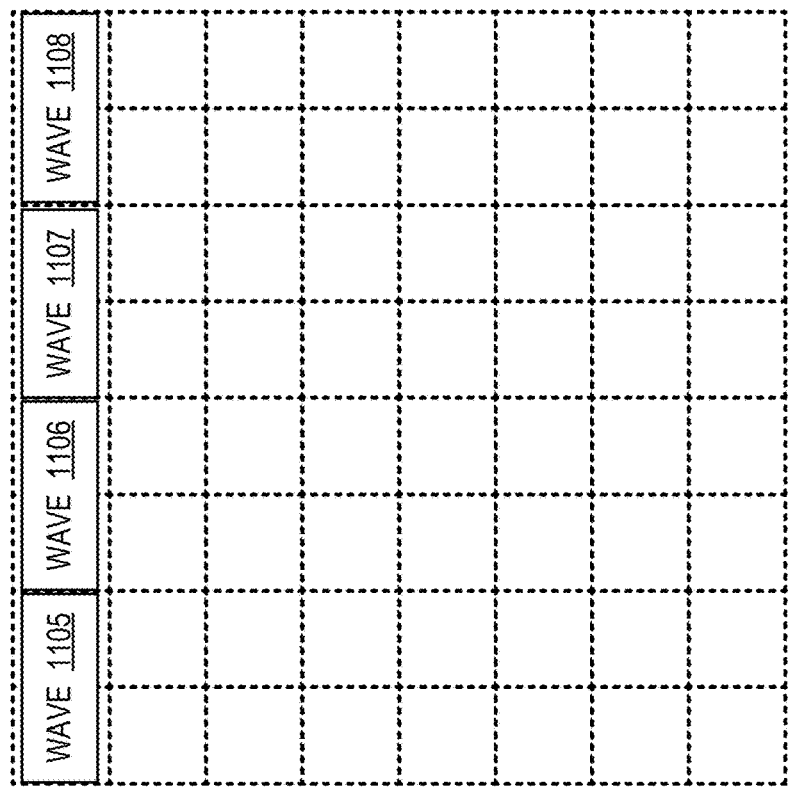

FIG. 11 is a block diagram of waves dispatched from a thread group 1100 and a corresponding access pattern for a texture cache 1101 according to some embodiments. The thread group is a 32×32 group of threads that are dispatched as waves by an SPI. For example, a wave 1105 includes a 4×8 thread group including 32 threads or work items. The waves 1106, 1107, 1108 are also 4×8 thread groups. The waves 1105-1108 are mapped to corresponding cache lines in the texture cache 1101. For example, the wave 1105 is mapped to the cache lines 1110 and 1111, the wave 1106 is mapped to the cache lines 1112 and 1113, the wave 1107 is mapped to the cache lines 1114 and 1115, and the wave 1108 is mapped to the cache lines 1116 and 1117. Since each work item in the waves 1105-1108 is mapped to a corresponding pixel in the texture cache 1101, partial writes involving the cache lines 1110-1117 are reduced or eliminated.

Figure 12:
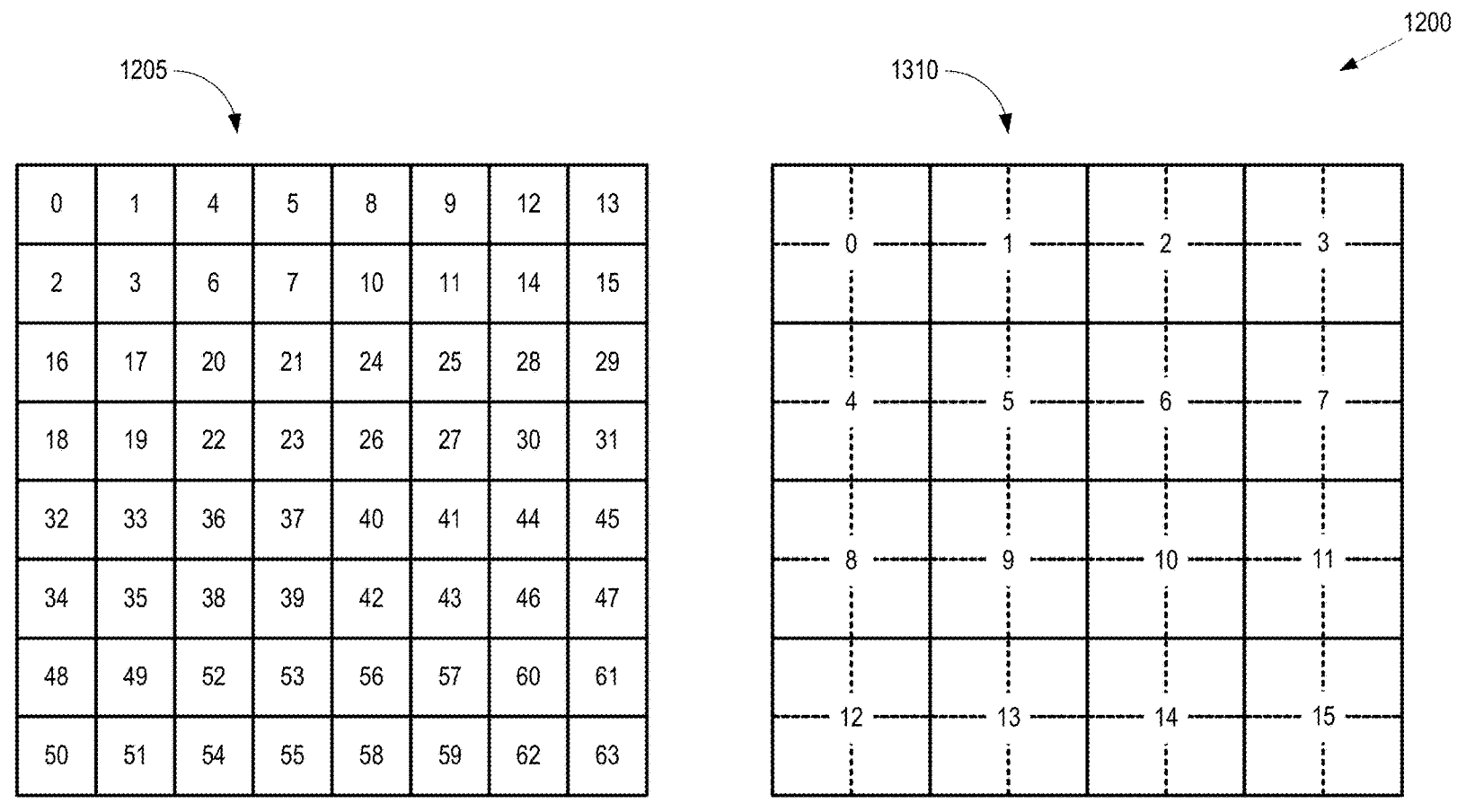

FIG. 12 is a block diagram of a tile mode 1200 according to some embodiments. The view 1205 illustrates ordering of the threads in the tile mode 1200. For example, the four blocks in the upper left of the view 1205 show ordering of the threads 0-3 and the four blocks in the lower right of the view 1205 show the ordering of the threads 60-63. The threads are grouped into 2×2 tiles such as the tile including the four threads 0-3 that are indicated by the four blocks in the upper left of the view 1205. The view 1210 illustrates ordering of the 2×2 tiles in the tile mode 1200. Each block in the view 1210 represents a 2×2 tile and the numeral inside the blocks indicates sequencing of the blocks. The numerals representing the threads are not shown in the view 1210 in the interest of clarity. In the tile mode 1200, the 2×2 tiles are arranged sequentially in order increasing from left to right and top to bottom. For example, a first set (indicated by 0 in the view 1210) includes the tiles 0-3, a second set (indicated by 1 in the view 1210) includes the tiles 4-7, a third set (indicated by 2 in the view 1210) includes the tiles 16-19, and a fourth set (indicated by 3 in the view 1210) includes the tiles 20-23. The threads are arranged sequentially within each of the 2×2 tiles, e.g., the tile 0 includes the threads 0-3 and the tile 1 includes the threads 4-7.

Figure 13:
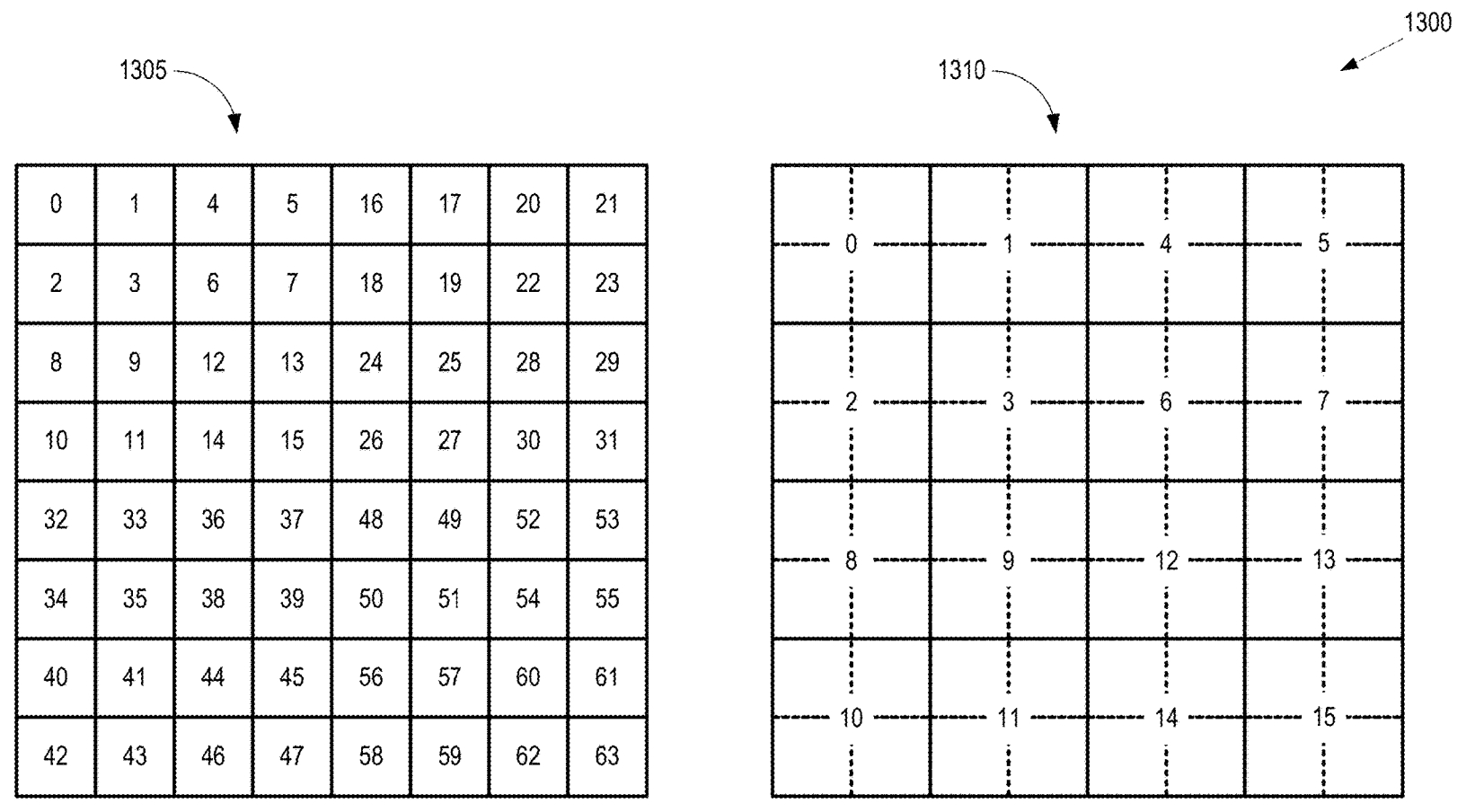

FIG. 13 is a block diagram of a Morton mode 1300 according to some embodiments. The view 1305 illustrates ordering of the threads in the Morton mode 1300. For example, the four blocks in the upper left of the view 1305 show ordering of the threads 0-3 and the four blocks in the lower right of the view 1305 show the ordering of the threads 60-63. The threads are grouped into 2×2 tiles such as the tile including the four threads 0-3 that are indicated by the four blocks in the upper left of the view 1305. The view 1310 illustrates ordering of the 2×2 tiles in the Morton mode 1300. Each block in the view 1310 represents a 2×2 tile and the numeral inside the blocks indicates sequencing of the blocks. The numerals representing the threads are not shown in the view 1310 in the interest of clarity. In the Morton mode 1301, the 2×2 tiles are arranged in 2×2 sets of 2×2 tiles that include consecutive numerals. For example, a first set (indicated by 0 in the view 1310) includes the tiles 0-3, a second set (indicated by 1 in the view 1310) includes the tiles 4-7, a third set (indicated by 2 in the view 1310) includes the tiles 8-11, and a fourth set (indicated by 3 in the view 1310) includes the tiles 12-15. The threads are arranged sequentially within each of the 2×2 tiles, e.g., the tile 0 includes the threads 0-3 and the tile 1 includes the threads 4-7.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
at least one scheduler circuit configured to schedule and launch work items from a thread group for execution on at least one shader engine; and
a command processor configured to selectively dispatch the work items to the at least one scheduler circuit based on a size of the thread group corresponding to a format of cache lines of a cache implemented in the at least one shader engine, wherein the format of the cache lines is associated with a texture access pattern.

2. The apparatus of claim 1, wherein the command processor is configured to operate in a display mode or tile mode in which the command processor is configured to schedule the work items in multidimensional blocks that correspond to the format of the cache lines.

3. The apparatus of claim 2, wherein the cache lines are implemented using a two-dimensional m×n format, and wherein the command processor is configured to schedule the work items in two-dimensional k×l blocks, m being an integer multiple of k and n being an integer multiple of l.

4. The apparatus of claim 2, wherein the format of the cache lines is determined by a texture surface format and a swizzle mode for storing texture data, and wherein the command processor or GPU driver is configured to determine a wave size and the tile mode of thread group block based on at least one of the texture surface format and the swizzle mode.

5. The apparatus of claim 4, wherein the command processor is configured to group the work items into thread group blocks based on at least one of the wave size and the tile mode of thread group block.

6. The apparatus of claim 5, wherein the command processor is configured to add work items having consecutive indices to a thread group block so that the work items in the thread group are provided to a same scheduler circuit.

7. The apparatus of claim 5, wherein the command processor is configured to add work items from a batch having a number of work items that is less than a threshold to thread group blocks that are provided to a same scheduler circuit for scheduling on a subset of shader engines.

8. The apparatus of claim 7, wherein shader engines that are not in the subset are placed in a low-power mode.

9. The apparatus of claim 5, wherein the at least one scheduler circuit is configured to adaptively select a wave size, tile size, and wave walk mode based on a thread group size and the texture surface format, and wherein the at least one scheduler circuit is configured to adaptively launch and schedule waves in a thread group based on the selected tile size, wave walk mode, and wave size.

10. A method comprising:
selectively dispatching, from a command processor, work items from a thread group to at least one scheduler circuit based on a size of the thread group corresponding to a format of cache lines of a cache implemented in at least one shader engine, wherein the format of the cache lines is associated with a texture access pattern; and
scheduling, by the at least one scheduler circuit, the work items for execution on at least one shader engine.

11. The method of claim 10, further comprising:
operating the command processor in a tile mode; and
scheduling, at the command processor, the work items in multidimensional blocks that correspond to the format of the cache lines in response to the command processor being in the tile mode.

12. The method of claim 11, wherein the cache lines are implemented using a two-dimensional m×n format, and further comprising:

scheduling, at the command processor, the work items in two-dimensional k×l blocks, m being an integer multiple of k and n being an integer multiple of l.

13. The method of claim 11, wherein the format of the cache lines is determined by a texture surface format and a swizzle mode for storing texture data.

14. The method of claim 13, further comprising:
determining, at the command processor, a wave size and the tile mode based on at least one of the texture surface format and the swizzle mode; and
grouping, at the command processor, the work items into thread group blocks based on at least one of the wave size and the tile mode.

15. The method of claim 14, further comprising:
adding, at the command processor, work items having consecutive indices to thread group blocks; and
providing the thread group blocks to a same scheduler circuit.

16. The method of claim 14, further comprising:
adding, at the command processor, work items from a batch having a number of work items that is less than a threshold to thread group blocks that are provided to a same scheduler circuit for scheduling on a subset of shader engines.

17. The method of claim 16, further comprising:
placing shader engines that are not in the subset in a low-power mode.

18. The method of claim 14, further comprising:
adaptively selecting, at the at least one scheduler circuit, a wave size, tile size, and wave walk mode based on a thread group size and the texture surface format; and
adaptively launching and scheduling, at the at least one scheduler circuit, waves in a thread group based on the selected tile size, wave walk mode, and wave size.

19. A method, comprising:
adding, by a command processor, work items having consecutive indices to multidimensional blocks that correspond to a format of cache lines of a cache implemented in at least one shader engine, wherein the format of the cache lines is associated with a texture access pattern;
dispatching, by the command processor, the work items in the multidimensional blocks to a scheduler circuit; and
launching, by the scheduler circuit, thread groups including the work items in the multidimensional blocks to the at least one shader engine for execution.

20. The method of claim 19, further comprising:
determining the format of the cache lines based on at least one of a texture surface format and a swizzle mode; and
grouping the work items into thread group blocks based on a wave size or a tile mode determined by at least one of the texture surface format and the swizzle mode.

* * * * *